United States Patent Office 3,519,593
Patented July 7, 1970

3,519,593
POLYMER COATED MINERAL FILLER AND
METHOD OF MAKING AND USING SAME
Justin C. Bolger, Needham, Mass., assignor to Amicon Corporation, Cambridge, Mass., a corporation of Massachusetts
No Drawing. Filed May 22, 1967, Ser. No. 640,372
Int. Cl. C08f 45/06, 45/10; C09c 3/00
U.S. Cl. 260—41                                   18 Claims

ABSTRACT OF THE DISCLOSURE

Mineral fillers are dispersed in an organic solvent with a cationic or anionic surface active agent and coated with a water-insoluble vinyl polymer either by mixing with the dispersion a solution of the preformed polymer or by polymerizing the polymer on the filler surface. The coated fillers are used in enhancing the properties of synthetic thermoplastic polymeric materials, particularly polypropylene.

This invention relates to a method of preparing mineral filler particles adapted for the use in synthetic thermoplastic polymeric compositions, particularly polypropylene compositions, and pertains more specifically to a process for applying an adherent coating of polymer made from ethylenically unsaturated monomer on the surface of mineral filler particles and to the coated particles and the use of the same.

In the case of plastics such as polypropylene the addition of conventional mineral fillers such as chrysotile asbestos to the polymer composition tends to result in embrittlement and reduced thermal and oxidative stability of the polymer; in addition, direct dispersion of mineral fillers, particularly asbestos or other fibrous material of sub-micron particle size, in polypropylene in molten form is very difficult to carry out satisfactorily on a commercial scale.

According to the present invention there is provided a method which comprises dispersing in a volatile organic solvent substantially free from water, i.e. containing less than about 5% water by weight, a finely-divided mineral filler together with a cationic or anionic surface active agent, then applying a coating of polymer to the surface of the filler particles, the coating preferably being one in which the polymer is incompletely polymerized, i.e. retains residual ethylenic unsaturation and is capable of further polymerization. The coated filler particles may then be separated from the volatile organic solvent by mixing a large amount of water with the dispersion to cause precipitation or coagulation, then filtering the precipitate and drying. The dried coated filler particles are suited for mixing or dispersing with a synthetic thermoplastic polymer, particularly polypropylene, in any conventional manner and exhibit little or no tendency to agglomerate or clump together before or during the mixing step. In another embodiment of the invention finely-divided particles of the synthetic plastic composition may be added to or mixed with the dispersion of coated mineral filler particles in the volatile organic solvent after which both the coated filler particles and the synthetic plastic particles may be separated from the organic solvent by the addition of a large amount of water, which causes precipitation or coagulation of all of the particles, followed by filtering and drying. The polymer coating may be applied to the filler particles either by mixing with the dispersion of filler particles a solution of a polymer in a volatile organic solvent miscible with the solvent present in the dispersion, or by adding to the dispersion of filler particles an ethylenically unsaturated monomer together with an oil-soluble initiator of polymerization to bring about polymerization of the monomer on the surface of the particles.

The fillers of the present invention, when incorporated in compositions such as polypropylene, provide physical properties superior to those which can be obtained by incorporating the same filler particles having no surface coating of polymer; polypropylene compositions in which the coated particles of the present invention are incorporated display considerably superior resistance to thermal and oxidative degradation.

The mineral fillers which may be used in the present invention include any of the usual fillers of small particle size, whether they be in the form of approximately isometric particles or whether they be in the form of plates, needles or fibers. In general, the size of the primary particle should be small enough to (a) avoid inconveniently rapid settling rates of the particles from the organic solvent medium used for the coating procedure described below and (b) permit incorporation of the coated particles into synthetic plastic compositions and treatment of the latter by conventional mixing, extrusion, or molding apparatus and techniques. As an approximation, it is desirable that the size of the primary particle be small enough so that its (Stokes law) settling velocity in the organic solvent medium be less than about 0.1 cm./sec. Although the process of this invention is of greatest benefit when applied to filler particles of sub-micron size, which are very difficult to disperse in polypropylene melts by conventional blending technique, the minimum size of the mineral filler particles is not critical, any of the conventional silica, calcium silicate, magnesium silicate or alumino-silicate fillers being suitable in this respect. Among the fillers which may be used are kaolin, talc, silica, pyrophyllite, mica, and such fibrous fillers as asbestos, either chrysotile or anthophyllite or crocidolite, wollastonite, attapulgite, and the like.

The volatile organic solvents which may be employed as a medium in which the filler particles are dispersed for the coating operation may be either water-miscible or water-immiscible. Among suitable solvents are alcohols such as methanol, ethanol, propyl alcohol, ether-alcohols such as 2-methoxyethanol, 2-ethoxyethanol, 2-butoxyethanol, and the like, ketones such as acetone, methylethyl ketone, diethyl ketone, and the like, aromatic solvents such as benzene, toluene, xylene, chlorobenzenes, and the like, and aliphatic or cycloaliphatic hydrocarbon solvents such as n-hexane or cyclohexane or the like, and mixtures of any of the foregoing which are miscible with each other.

Any of the usual cationic surface active agents may be used in carrying out the process of the present invention including fatty amines such as hexadecyl amine, stearyl amine, methyl stearyl amine, dimethyl stearyl amine, and quatenary ammonium compounds such as cetyltrimethylammonium chloride, coconut fatty alkyl dimethyl benzyl ammonium bromide, coconut fatty alkyl trimethyl ammonium chloride, stearyl dimethyl benzyl ammonium chloride, distearyl dimethyl ammonium chloride and the like. The cationic surface active agents are employed with mineral filler particles which have a negative surface charge, i.e. which tend to bind or exchange cations, such as kaolin, talc, Attapulgite, silica, pyrophyllite, etc. In the case of mineral filler particles which have a positive surface charge and which tend to bind or exchange anions, such as chrysotile asbestos there should be used anionic surface active agents such as nonyl phenoxyacetic acid, sodium lauryl sulfate, sodium dodecyl benzene sulfonate, sodium lignosulfonates, the sodium salt of dodecyl diphenyl ether disulfonic acid, and the like.

In general, the amount of mineral filler particles may vary from 1 to 25% by weight of the volatile organic solvent, and the amount of surface active agent may vary from 0.2 to 10% by weight of the mineral filler particles. The particles may be dispersed in the solvent along with the surface active agent by agitating the mixture in any conventional stirring device having a high shear, such as a Cowles dissolver, a Waring Blendor, or a Premier Dispersator. In the case of materials such as asbestos which have the particles in the form of clusters of very small fibers it will be found that an aging period after the mixing has been completed will assist in dispersing the particles and in separating the individual primary fibers from their bundles.

The polymer used for coating the mineral filler particles may be prepolymerized or may be polymerized in situ on the surface of the particles. In either case there may be used a polymer of any monomer containing one or more ethylenic unsaturations, i.e. open chain carbon-carbon double bonds. Preferably the polymer should be made from a monomer or mixture of monomers at least a portion of which contains two or more ethylenic unsaturations in each monomer molecule and preferably polymerization is stopped short of completion to leave some residual unsaturation present in the polymer coating. In general, it is preferred that at least one ethylenic unsaturation in the polymerizable compound be a vinyl group because of the greater ease of polymerization of such compounds at moderate temperatures. The preferred amount of residual unsaturation is from 1 to 5% of the carbon-carbon unsaturations, or ethylenic bonds, originally present in the monomer. Substantially all of the foregoing monomers are water-insoluble. Among suitable polymers are those of butadiene, styrene-butadiene, acrylonitrile-butadiene, styrene-maleic anhydride, partial esters of styrene-maleic anhydride including lower alkyl esters and allylic esters, styrene, divinyl benzene, acrylic and methacrylic esters of alkyl alcohols and of polyhydroxy alcohols such as methyl acrylate, ethyl acrylate, ethyl methacrylate, butylene glycol dimethacrylate, butylene glycol diacrylate, ethylene glycol diacrylate, ethylene glycol dimethacrylate, diethylene glycol diacrylate and dimethacrylate, diisopropylene glycol dimethacrylate, triethylene glycol diacrylate and dimethacrylate, polyethylene glycol diacrylates and dimethacrylates, neopentyl glycol diacrylate and dimethacrylate, trimethylol propane trimethacrylate, trimethylol propane triacrylate, ethylidene diacrylate, ethylidene dimethacrylate, allyl acrylate, allyl methacrylate, ethylene, propylene, isobutylene, cyclopentadiene, dicyclopentadiene, divinyl benzene, vinyl methacrylate, vinyl crotonate, vinyl itaconate, bis-allyl glycol dicarbonate, triallyl cyanurate, acetyl triallyl nitrate, diallyl phthalate, ethylene-propylene-butadiene terpolymer, tetrallyl methylene diamine, divinyl oxymethane, tetrallyl oxyethane, 3-methyl-1, 4,6-heptatriene, 1,6-hexamethylene glycol diacrylate and dimethacrylate, 1,10-decamethylene glycol dimethacrylate, 1,1,1-trimethylol ethane triacrylate and trimethacrylate, and other similar unsaturated compounds containing one or more ethylenic unsaturations, and mixtures thereof. Substantially all of the foregoing ethylenically unsaturated monomers are water insoluble.

It is also possible to polymerize in situ on the surface of the particles ethylenically unsaturated monomeric materials which are water-soluble at least to a limited extent and which have surface active properties; among such monomers are methyl vinyl pyridine, vinyl pyridine, aminoalkyl acrylates and methacrylates such as aminoethyl acrylate, aminoethyl methacrylate, t-butylaminoethyl acrylate and methacrylate, and the like in which the alkyl groups contain as many as five carbon atoms. The foregoing may be employed with filler particles having a negative surface charge. With filler particles having a positive surface charge there may be used such surface active monomers as acrylic acid, methacrylic acid, maleic acid, fumaric acid, and the like. Other ethylenically unsaturated monomers having surface active properties may be used with filler particles having either positive or negative surface charges; among such monomers are hydroxylalkyl acrylates and methacrylates in which the alkyl groups contain as many as five carbon atoms, such as hydroxy propyl acrylate and methacrylate; vinyl trichlorosilane; vinyl trialkoxy silanes in which the alkoxy groups contain as many as five carbon atoms; and the like.

When the polymeric coating is polymerized in situ there is added to the dispersion of mineral filler particles in addition to the monomeric material an oil-soluble initiator of polymerization such as an organic peroxide or hydroperoxide or the like in an amount up to 5% by weight of the monomeric material; usually at least 0.1% by weight is needed to provide the desired polymerization. Among suitable oil-soluble initiators which may be employed are lauroyl peroxide, benzoyl peroxide, azobisisobutyronitrile, tertiary butyl perbenzoate, dicumyl peroxide, di(tertiary butyl)peroxide, cumene hydroperoxide, 2,5-dimethyl-2,5-di(t-butyl-peroxy)hexane, 2,5-dimethyl-2,5 di(t-butyl-peroxy)hexyne, tertiary butyl hydroperoxide, isopropyl percarbonate, and the like.

The amount of polymer employed for coating the mineral particle fibers may vary over a considerable range from as little as 1% by weight of the mineral particles to as much as 50% by weight or even more. Generally, it is preferred to employ from 2 to 20% by weight, based on the weight of the mineral filler particles. Mixing of the polymer with the mineral filler particles may be carried out at room temperature or at elevated temperatures; when polymerization is carried out in situ on the surface of the filler particles it is usually preferred to employ an elevated temperature of the order of 50° C. to 100° C. for the polymerization. After the solution of prepolymerized polymer in a suitable miscible solvent has been thoroughly mixed with the dispersion of the mineral filler particles, or after polymerization of monomer has been carried out to the desired extent, the coated particles may be separated from the solvent by evaporation of the solvent or by adding to the solvent dispersion a large excess of water, from 200 to 1000% by volume of the solvent present, whereupon the coagulum or precipitate which forms may be separated from the water and solvent by filtration and dried either at room temperature or at elevated temperature up to 150° C. The addition of the large amount of water to the dispersion also serves to terminate any polymerization, thus leaving residual unsaturated groups capable of further polymerization. The coated mineral filler particles after drying may readily be dispersed in any desired synthetic plastic or rubber composition, the latter being either in the form of a particulate solid or in the form of a plastic mass, by any of the usual methods. If desired, it is also possible to add the particulate synthetic plastic or rubber composition to the dispersion of coated mineral filler particles before removal of the solvent. The latter may be removed by evaporation, or by the addition of a large excess of water followed by filtration and drying as described above.

The coated filler particles of the present invention may be employed in the usual range of proportions when mixed with polypropylene compositions, i.e. in amounts up to about 70% by weight of the total composition.

The following specific examples are intended to illustrate more clearly some preferred embodiments of the present invention without acting as a limitation upon its scope.

EXAMPLE 1

There were stirred into a mixture of 500 parts by weight of ethanol and 220 parts by weight of 2-ethoxy ethanol 25 parts by weight of Coalinga chrysotile asbestos and there were added 1.25 parts by weight of nonyl phenoxy acetic acid. Coalinga is a high purity grade of chrysotile asbestos from deposits in Coalinga, Calif., having primary fibrils about 1 to 10 microns in length and about 30 millimicrons in diameter. The mixture was heated to about 80° C. and agitation continued for 10 minutes to produce a well-separated dispersion of asbestos fibers.

To this dispersion there were added one part by weight of t-butyl amino ethyl methacrylate, 8 parts of diethylene glycol diacrylate, and one part of a 20% solution of benzoyl peroxide in toluene. The mixture was stirred for 20 minutes at a temperature of 80° C. during which period it continued to be very fluid. No separate polymer phase could be detected by dark field examination at a magnification of 400×, but well-dispersed, highly-defibrilated asbestos was evident. The dispersion was then heated at 100° C. to evaporate the volatile solvents. The resultant dried fibers were hydrophobic but were readily dispersed in acetone or in other organic solvents. The weight of the polymer coating on the individual particles was approximately 25% by weight of the asbestos as shown by the loss in weight when heated at 500° F.

EXAMPLE 2

The same procedure was carried out as described in Example 1 except that the sodium salt of dodecyl diphenyl ether disulfonate was substituted for the nonyl phenoxy acetic acid. The results were substantially the same as described in Example 1. Similar results were also obtained by substituting the sodium salt of dodecyl benzene sulfonate, the dihexyl ester of sodium sulfosuccinic acid, or the bis(tridecyl) ester of sodium sulfosuccinic acid.

EXAMPLE 3

Into a mixture of 480 parts by weight of ethanol and 120 parts of 2-ethoxyethanol there were stirred 40 parts by weight of Coalinga asbestos together with 2 parts by weight of nonyl phenoxy acetic acid. The mixture was heated to about 80° C. and stirred for about 10 minutes. To the dispersion there were then added 20 parts by weight of a 10% solution in cyclohexane of ethylene propylene butadiene terpolymer (Nordel 1145), and stirring was continued for five minutes at 80° C. The entire suspension was then poured into approximately five times its volume of water at room temperature with thorough stirring. A coagulum collected at the water surface which was recovered by filtration and drying in an air oven at 100° C. The resultant product was in the form of a loose powder consisting of asbestos fibers coated with the polymer. The dispersions of Examples 1 and 2 could also be separated from the organic solvents by pouring into water as described above.

EXAMPLE 4

Into a mixture of 480 parts by weight of ethanol and 120 parts of 2-ethoxyethanol there were stirred 40 parts by weight of Coalinga asbestos along with 1.6 parts of sodium dodecyl diphenyl ether disulfonate. The mixture was heated to 80° C. and maintained at that temperature with stirring for 20 minutes, at which time there were added 2 parts of butylene glycol dimethacrylate and 0.1 part of benzoyl peroxide followed immediately by the addition of 6 parts of a 50% solution in xylene of partially oxidized styrene-butadiene copolymer (mol. wt. about 2500, acid No. 17-23). Stirring was continued for another 30 minutes at 80° C. to bring about coating of the asbestos fibers with the copolymer and with the partially polymerized dimethacrylate. The dispersion was then poured into five times its volume of water at room temperature, stirred, filtered, and dried as described in Example 3.

EXAMPLE 5

The procedure described in Example 4 was repeated, except that allyl methacrylate was used as the vinyl monomer (in place of butylene glycol dimethacrylate) and ethylene propylene butadiene terpolymer was used as the elastomer (in place of the oxidized styrene-butadiene rubber).

EXAMPLE 6

The procedure described in Example 4 was repeated, except that a wollastonite (calcium silicate) fiber was used in place of the chrysotile asbestos fibers.

EXAMPLE 7

The procedure described in Example 4 was repeated except that kaolin (Georgia kaolin hydrite 10, 2 micron average particle size) was used in place of the chrysotile asbestos, and dioctadecyl dimethyl ammonium chloride was used in place of the disulfonate. The kaolin particles appeared to be uniformly coated with polymer, whereas a comparison sample wherein the quaternary salt was omitted yielded kaolin particles which were essentially free of a polymer layer.

The polymer coated fibers produced according to Example 4 were melt blended into stabilized polypropylene resin (Hercules Profax 6523) by first adding the resin pellets to an oil heated Brabender roller head mixer, maintained at 190° C., and fluxing the resin at 40 r.p.m. The dried polymer coated fibers were then added to the polypropylene melt in the ratio 1 part fiber to 4 parts polypropylene by weight and dispersed by mixing at 200 r.p.m. for 5 minutes. The blend (A) was then discharged from the mixer, chopped into pellets, and injection molded into test bars for tensile and notched Izod testing, and for measurement of thermal and oxidative stability.

Other specimens (B) were prepared in the same way except that no filler was mixed with the polypropylene, and a third set (C) was prepared in which uncoated Coalinga asbestos was substituted for the coated fibers of Example 4.

Microscopic examination of the compositions (A) and (C) showed the latter to have poor dispersion of the asbestos, many of the fibers remaining in large bundles, whereas (A) exhibited excellent dispersion with no bundles appearing.

When maintained in hot air at 140° C., specimens (A) and (B) showed no significant deterioration after 4 days, but specimen (C) darkened and became so weak and brittle that it could be crumbled by hand after less than 24 hours.

The physical properties of the specimens were determined to be as follows:

|   | Tensile, p.s.i. | Modulus, p.s.i. | Elongation at— | | Izod Impact, ft./lb./in. |
|---|---|---|---|---|---|
|   |   |   | Yield, percent | Fail, percent |   |
| A | 6,110 | 339,000 | 10 | 23 | 0.62 |
| B | 4,600 | 137,000 | 10 | 140 | 0.52 |
| C | 6,080 | 330,000 | 5 | 5 | 0.56 |

The impact strength and the elongation at fail are particularly significant in showing the advantages of the method of the present invention.

Similarly improved properties and resistance to thermal and oxidative deterioration is demonstrated by specimens prepared by mixing coated fibers prepared as described in the other examples above with polypropylene, the dispersion of the coated filler particles in every case being superior to the dispersion of the corresponding uncoated filler particles.

Although specific embodiments of the invention have been described herein, it is not intended to limit the invention solely thereto but to include all of the variations and modifications which suggest themselves to one skilled in the art.

What is claimed is:
1. The method which comprises mixing together (1) a volatile organic solvent substantially free from water, (2) a member of the class consisting of (a) an ethylenically unsaturated monomer and an oil soluble polymerization initiator and (b) a solution of a water-insoluble polymer of an ethylenically unsaturated monomer in a volatile organic solvent miscible with the first said sol- vent, (3) a finely-divided mineral filler, and (4) a member of the class consisting of cationic and anionic surface active agents in an amount to produce a dispersion of the filler particles which have an organophilic surface, and heating said mixture when monomer is present to bring about polymerization, whereby said particles become coated with a water-insoluble polymer of an ethylenically unsaturated monomer in an amount from 1 to 50% by weight of said filler.

2. The method as claimed in claim 1 in which the amount of said filler is from 1 to 25% by weight of said solvent and the amount of said agent is from 0.2 to 10% by weight of said filler.

3. The method as claimed in claim 2 in which the coating is carried out by employing a solution of said polymer in a volatile organic solvent miscible with the first said solvent.

4. The method as claimed in claim 3 in which the solvents are subsequently removed by diluting the dispersion with water and filtering.

5. The method as claimed in claim 4 in which the water-insoluble polymer contains residual unsaturation and is selected from the class consisting of copolymer of t-butyl amino ethyl acrylate and diethylene glycol diacrylate; ethylene-propylene-butadiene terpolymer; polymer of butylene glycol dimethacrylate and partially oxidized styrene-butadiene copolymer; polymer of allyl methacrylate and ethylene-propylene-butadiene terpolymer.

6. The method as claimed in claim 5 including the additional step of blending the coated particles with a synthetic thermoplastic polymer.

7. The method as claimed in claim 6 in which the synthetic thermoplastic polymer is polypropylene.

8. The method as claimed in claim 6 in which the mineral filler is chrysotile asbestos.

9. The method as claimed in claim 7 in which the mineral filler is chrysotile asbestos.

10. The method as claimed in claim 2 in which the coating is carried out by employing an ethylenically unsaturated monomer and an oil-soluble polymerization initiator, and heating said mixture to cause polymerization of said monomer to occur.

11. The method as claimed in claim 10 in which said initiator is an organic peroxide.

12. The method as claimed in claim 11 in which the monomer is selected from the class consisting of t-butyl amino ethyl acrylate, diethylene glycol diacrylate, butylene glycol dimethacrylate, and allyl methacrylate.

13. The method as claimed in claim 12 in which said solvent is removed by diluting the mixture with water and filtering.

14. The method as claimed in claim 13 in which the monomer molecule includes two ethylenic unsaturations.

15. The method as claimed in claim 13 including the additional step of blending the coated filler particles with a synthetic thermoplastic polymer.

16. The method as claimed in claim 15 in which the synthetic thermoplastic polymer is polypropylene.

17. The method as claimed in claim 15 in which the mineral filler is chrysotile asbestos.

18. The method as claimed in claim 16 in which the mineral filler is chrysotile asbestos.

References Cited

UNITED STATES PATENTS

| | | | |
|---|---|---|---|
| 3,265,644 | 8/1966 | Herman | 117—100 |
| 3,272,897 | 9/1966 | Herman | 117—100 |
| 3,348,959 | 10/1967 | Csonka | 106—308 |
| 2,879,244 | 3/1959 | Coler. | |
| 2,883,356 | 4/1959 | Gluesenkamp | 260—37 |
| 3,215,663 | 11/1965 | Weisberg. | |
| 3,304,197 | 2/1967 | Pundsack et al. | |

OTHER REFERENCES

Schwartz and Perry: Surface Active Agents, vol. 1, 1949, Interscience Pub., New York, p. 509.

MORRIS LIEBMAN, Primary Examiner

P. R. MICHL, Assistant Examiner

U.S. Cl. X.R.

106—308; 117—100; 260—41.5